Feb. 12, 1952            R. J. WELSH            2,585,200

GOVERNING OF FREE PISTON GAS GENERATOR POWER PLANT

Filed Sept. 4, 1945            2 SHEETS—SHEET 1

Inventor:
Robert J. Welsh
By Babcock & Babcock
Attorneys

Patented Feb. 12, 1952

2,585,200

UNITED STATES PATENT OFFICE 2,585,200

GOVERNING OF FREE PISTON GAS GENERATOR POWER PLANT

Robert James Welsh, Rugby, England, assignor to The English Electric Company Limited, London, England, a British company Application September 4, 1945, Serial No. 614,307
In Great Britain March 2, 1944

Section 1, Public Law 690, August 8, 1946
Patent expires March 2, 1964

3 Claims. (Cl. 60—13)

This invention relates to an internal combustion engine-driven compressor used as a gas generator to supply motive fluid to a prime mover (e. g., a gas turbine), the output of the gas generator being regulated in accordance with the power requirements of the prime mover. The motive fluid may be air from the compressor or more usually the exhaust from the engine cylinder (comprising the products of the combustion in the engine cylinder mixed with any charging or scavenging air supplied to the engine by the compressor) with or without the admixture of air coming direct from the compressor. The internal combustion compressor may be of the free piston type—i. e. a device wherein a compressor piston is directly connected to or combined with an internal combustion engine piston instead of being driven thereby through connecting rods, cranks and crankshafts. The engine may work on a two-stroke compression ignition cycle with air from the compressor serving to scavenge and charge the engine cylinder and the output is then regulated by varying the quantity of fuel injected per cycle.

In plants of this kind as previously proposed the fuel supply to the gas generator or to each of a plurality of gas generators supplying motive fluid in common to the prime mover has been under the control of a speed governor actuated by the prime mover so that an increase in prime mover speed has caused the governor to decrease the fuel supply and vice versa.

According to the present invention the gas generator plant is of the kind in which pressure-responsive means cause the output of the gas generator or each gas generator to be so regulated as to maintain a predetermined pressure of motive fluid supplied to the prime mover but the means for determining this pressure can be regulated so as to raise or lower the pressure in accordance with the requirements of the prime mover. This may be done by hand or automatically—e. g., by a speed governor actuated by the prime mover. Thus in the latter case a fluid-pressure motor for the output regulator is jointly responsive to the pressure of the motive fluid and to the action of the speed governor.

Figure 1:
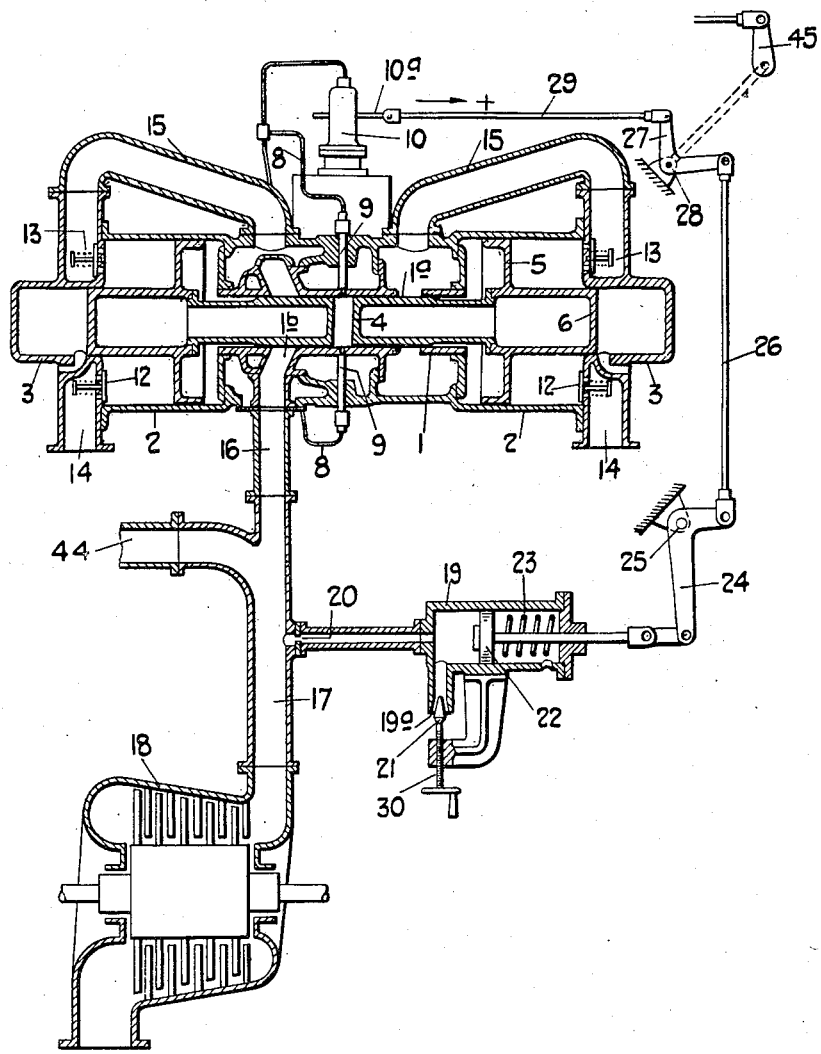
Figure 2:
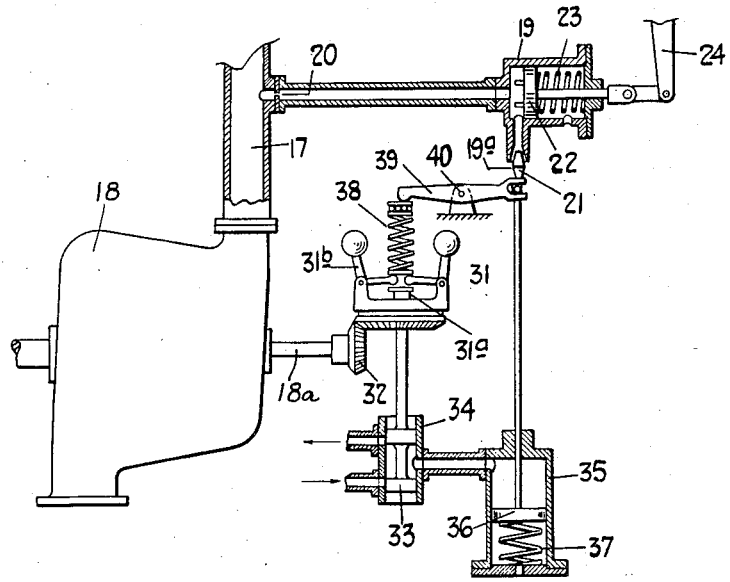
Figure 3:
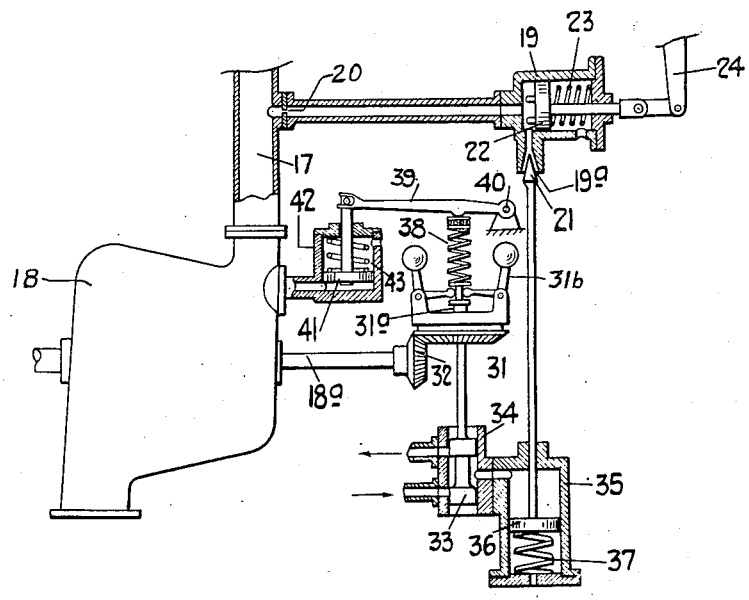

The invention is illustrated by the accompanying drawings of which Fig. 1 is a view mainly in section of one plant according to the invention while Figs. 2 and 3 are similar views of modifications. The compressor used as a gas generator is in each case of the free-piston type.

In all three embodiments, the body of the free piston type internal combustion engine-compressor is as shown in Fig. 1 and comprises the engine cylinder 1, the pair of compressor cylinders 2 at opposite ends thereof and the pair of buffer cylinders 3 at the extreme outer ends while each free piston unit consists of one of the opposed engine pistons 4 reciprocating in cylinder 1, a compressor piston 5 reciprocating in one of the cylinders 2, and a buffer piston 6 reciprocating in one of the cylinders 3. In the head of each compressor cylinder 2 is at least one inlet valve 12 which can put the cylinder 2 in communication with the suction inlet 14 and at least one discharge valve 13 which can put the cylinder 2 in communication with the conduits 15 communicating with the annular space surrounding the inlet ports 1a in the engine cylinder 1. The exhaust ports 1b in the latter open into an annular space communicating with the discharge conduit 16. The engine operates on the compression-ignition principle. Fuel can be injected into cylinder 1 by fuel injectors 9 of conventional form supplied through pipes 8 by the fuel pump 10 of conventional form having the usual slidable fuel-regulator 10a by which the quantity of fuel pumped per stroke can be varied.

The discharge conduit 16 is connected to the manifold 17, to which may be connected the discharge conduits from other gas generators, and which is connected to the inlet to the gas turbine 18.

The arrangement so far described is the conventional arrangement of such plant.

In applying the invention a vessel 19 connected to the manifold 17 has means for varying the ratio of the pressure in the vessel to the pressure in the manifold. To this end, the vessel is firstly connected to the conduit 17 through a restriction 20 having particular chosen proportions and is secondly provided with a valve 21 movable to vary the area of discharge orifice 19a; the pressure in the vessel will accordingly be proportional to the average pressure in the conduit 17, the ratio of the pressures being determined by the position of the discharge valve 21. The vessel 19 forms the cylinder of a fluid pressure servo-motor.

A piston 22 movable within cylinder 19 under the pressure therein and against the force of spring 23 can move the fuel rack 10a through bell-crank lever 24 turning about fixed pivot 25, link 26, bell-crank lever 27 turning about fixed pivot 28 and link 29. The force of spring 23 does not vary much with variation of compression. Thus the piston 22 can actuate fuel-rack 10a (serving as an output regulator) in a sense tending to maintain the pressure in the vessel 19 substantially constant and so tending to maintain gas which is in the conduit 17 and going as the motive fluid to the prime mover 18 at a pressure determined by the position of the discharge valve 21.

The direct actuation or control of the fuel rack 10a by the piston 22 is given only as an example of one way of carrying out the invention but it will be understood that the piston 22 may otherwise control the output of the gas generator.

In Fig. 1 the discharge valve 21 is opened and closed by hand operated screw 30 and the pressure of the motive gas going to the prime mover 18 is thus determined under the control of an operator or driver in accordance with load; in particular, for example, by the driver of a vehicle which is being propelled by the prime mover.

Alternatively, as shown in Fig. 2, the discharge valve 21 is opened and closed and the pressure of the motive fluid going to the prime mover 18 thus determined automatically by a servo-motor piston 36 controlled by a speed governor 31 actuated by the prime mover 18. The governor sleeve 31a moved by the arms 31b of the governor 31 which is driven through gearing 32 by the shaft 18a of the prime mover can move the piston valve 33 in the valve cylinder 34 to connect pressure or exhaust to the servo-motor cylinder 35 in which moves piston 36 against the force of spring 37 to open the valve 21. The movement of the valve 21 varies the compression of the governor loading spring 38 through loading lever 39 movable about fixed pivot 40, this arrangement forming a speed regulator operated automatically in accordance with load so as to give the prime mover a predetermined speed-load characteristic. Action is as follows:

On a decrease in the speed of the prime mover 18, the inward movement of the arms 31b moves valve 33 to apply pressure to piston 36 which increases the opening of valve 21 thereby lowering the pressure in the cylinder 19. The spring 23 accordingly moves the piston 22 which moves the fuel rack 10a in a direction to increase the fuel supply. This continues until there is such an increase in the pressure in the conduit 17 that firstly the pressure in cylinder 19 is restored substantially or approximately to normal and secondly the speed has been increased until the governor has reclosed by valve 33 the inlet to cylinder 35. The opening movement of valve 21 will have decreased the force exerted by the governor loading spring 38 so that the speed at which equilibrium is restored is slightly less than the previous steady speed. On an increase in turbine speed the movement of the governor arms 31b moves valve 33 to connect cylinder 35 to exhaust whereupon spring 37 moves piston 36 to perform the above described operations in reversed sense.

In the modification shown in Fig. 3, the governor loading lever 39 is moved about fixed pivot 40 by the piston 41 which can be moved in cylinder 42 by the pressure in the conduit 17 against the force of spring 43 in such a sense as to decrease the loading of the governor with an increase in the pressure of the motive fluid.

The invention is particularly applicable to plants wherein a number of gas generators supply a prime mover in common and the outputs of all the gas generators in action are under common control. For this purpose there may be one or more further inlets 44 to the manifold 17 which can be supplied by other gas generators, and one or more levers 45 (Fig. 1) secured to and moving with lever 27 so as to actuate fuel racks 10a of such other gas generators.

What I claim as my invention and desire to secure by Letters Patent is:

1. Power plant comprising, in combination, a prime mover, an internal combustion engine-driven power gas generator, a fuel injection quantity control member to said engine, a supply connection between the discharge of said power gas generator and the inlet of said prime mover, a branch pipe connected to said supply connection, a restriction in said branch pipe, a fluid pressure servo-motor cylinder connected to the said prime mover inlet through said branch pipe, a speed governor driven by the said prime mover, a leak-off valve on said servo-motor cylinder and in supply connection with said restriction operably controlled by the said speed governor and adapted to reduce its leakage area in response to overspeed of said prime mover and to increase its leakage area in response to underspeed of the said prime mover, a piston slidable in said servo-motor cylinder resiliently biased against the fluid pressure from the inlet to the said prime mover and in operable connection with the fuel injection quantity control member of the said device in such sense that a decrease in gas pressure in the said servo-motor cylinder increases the fuel injection quantity per cycle to the said device and hence its power output, and an increase in the said gas pressure reduces the said fuel quantity and power output.

2. Power plant according to claim 1 including an operating servo-motor linked to said leak-off valve, a control valve for said servo-motor actuated by said speed-governor on a deviation of prime mover speed from a given value, and a speed-regulator on said governor linked to said leak-off valve in such a sense that the speed-regulator is moving in the direction to decrease the said given value of speed when the leak-off valve is opening.

3. Power plant according to claim 1, including an operating servo-motor linked to said leak-off valve, a control valve for said servo-motor actuated by said speed governor on a deviation of prime mover speed from a given value, a pressure responsive device in supply connection with the inlet to the prime mover, and a speed regulator on said governor so linked to said pressure responsive device that an increase in the pressure of the motive fluid going to the prime mover tends to decrease the speed maintained by the governor and a decrease in the pressure of the motive fluid tends to increase the speed maintained by the governor.

ROBERT JAMES WELSH.

REFERENCES CITED

The following references are of record in the file of this patent:

UNITED STATES PATENTS

| Number | Name | Date |
| --- | --- | --- |
| 787,136 | Warren | Apr. 11, 1905 |
| 1,698,299 | Dickinson | Jan. 8, 1929 |
| 1,795,944 | Frey | Mar. 10, 1931 |
| 2,016,613 | Pateras Rescara | Oct. 8, 1935 |
| 2,147,935 | Steiner | Feb. 21, 1939 |